United States Patent
Bhashyam et al.

(10) Patent No.: US 6,618,729 B1
(45) Date of Patent: Sep. 9, 2003

(54) OPTIMIZATION OF A STAR JOIN OPERATION USING A BITMAP INDEX STRUCTURE

(75) Inventors: Ramesh Bhashyam, San Diego, CA (US); Olli Pekka Kostamaa, Santa Monica, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/556,009

(22) Filed: Apr. 20, 2000

(51) Int. Cl.[7] ............................................. G06F 17/00
(52) U.S. Cl. ................... 707/101; 707/100; 707/103 R; 707/2; 707/3; 707/4
(58) Field of Search ................. 707/101, 3–4, 707/100, 103 R, 2

(56) References Cited

U.S. PATENT DOCUMENTS

| | | |
|---|---|---|
| 5,222,233 A | 6/1993 | Parks |
| 5,426,760 A | 6/1995 | Moreland |
| 5,706,495 A * | 1/1998 | Chadha et al. ................. 707/2 |
| 5,781,896 A | 7/1998 | Dalal |
| 5,787,435 A | 7/1998 | Burrows |
| 5,802,521 A | 9/1998 | Ziauddin et al. |
| 5,864,842 A | 1/1999 | Pederson et al. |
| 5,893,104 A | 4/1999 | Srinivasan et al. |
| 5,905,985 A | 5/1999 | Malloy et al. |
| 5,937,408 A | 8/1999 | Shoup et al. |
| 5,953,723 A | 9/1999 | Linoff et al. |
| 5,960,428 A * | 9/1999 | Lindsay et al. ................. 707/4 |
| 5,960,434 A | 9/1999 | Schimmel |
| 5,963,933 A | 10/1999 | Cheng et al. |
| 5,963,954 A | 10/1999 | Burrows |
| 6,049,804 A * | 4/2000 | Burgess et al. ............. 707/100 |

OTHER PUBLICATIONS

Bontempo et al., Accelerating Indexed Searching, copyright 1997 Miller Freeman Inc., <http://www.dbpd.com/vault/bontempo.htm>.*

Cormen et al., Introduction to Algorithms, ISBN 0–07–0131143–0, pp. 219–243.*

* cited by examiner

Primary Examiner—Kim Vu
Assistant Examiner—Hung Pham
(74) Attorney, Agent, or Firm—Gates & Cooper LLP

(57) ABSTRACT

A method, apparatus, and article of manufacture for optimizing a star join operation in relational database management systems (RDBMS). A cross-product is generated from a plurality of dimension tables referenced by the star join. The join columns of the cross-product are then hashed to create a hash-row value. Using the hash-row value, a Star Map is probed to determine whether a record exists in a fact table that corresponds to the cross-product, wherein a first portion of the hash-row value is used to select a row of the Star Map and a second portion of the hash-row value is used to select a column of the selected row of the Star Map. The fact table is accessed to perform a merge join with the cross-product when the selected column of the selected row of the Star Map indicates that the record exists in the fact table.

44 Claims, 4 Drawing Sheets

OPTIMIZATION OF A STAR JOIN OPERATION USING A BITMAP INDEX STRUCTURE

BACKGROUND OF THE INVENTION

1. Field of the Invention

This invention relates in general to database management systems performed by computers, and in particular, to the optimization of a star join operation in a relational database management system using a bitmap index structure.

2. Description of Related Art

Relational DataBase Management Systems (RDBMS) using a Structured Query Language (SQL) interface are well known in the art. The SQL interface has evolved into a standard language for RDBMS software and has been adopted as such by both the American National Standards Institute (ANSI) and the International Standards Organization (ISO).

In an RDBMS, all data is externally structured into tables. A table in a relational. database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT <clause>FROM <clause>WHERE <clause>GROUP BY <clause>HAVING <clause>ORDER BY <clause>." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

A join operation is usually implied by naming more than one table in the FROM clause of a SELECT statement. A join operation makes it possible to combine tables by combining rows from one table with another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

Star joins involve one or more dimension tables joined to a fact table. Star join operations can also be costly in terms of performance time.

Techniques have been developed for minimizing the time required to perform a star join operation. However, there is still a need in the art for additional optimization techniques for star join operations.

SUMMARY OF THE INVENTION

To overcome the limitations in the prior art described above, and to overcome other limitations that will become apparent upon reading and understanding the present specification, the present invention discloses a method, apparatus, and article of manufacture for optimizing a star join operation in relational database management systems (RDBMS). A cross-product is generated from a plurality of dimension tables referenced by the star join. The join columns of the cross-product are then hashed to create a hash-row value. Using the hash-row value, a Star Map is probed to determine whether a record that corresponds to the cross-product exists in a fact table, wherein a first portion of the hash-row value is used to select a row of the Star Map and a second portion of the hash-row value is used to select a column of the selected row of the Star Map. The fact table is accessed to perform a join with the cross-product when the selected column of the selected row of the Star Map indicates that the record might exist in the fact table.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The present invention comprises a bitmap index structure, known as a Star Map, that improves the performance of star joins and other large table joins that have low join cardinality. The present invention uses hash-based addressing in the Star Map, so that the size of the Star Map is constant and therefore access times are constant. Moreover, access times are independent of the number of rows in the fact table, up to a preset limit, which can be altered by a systems administrator. As a result, the Star Map improves the performance of star joins where a cross-product of dimension tables is joined to a fact table and the result of the join is a small number of rows.

ENVIRONMENT

Figure 1:
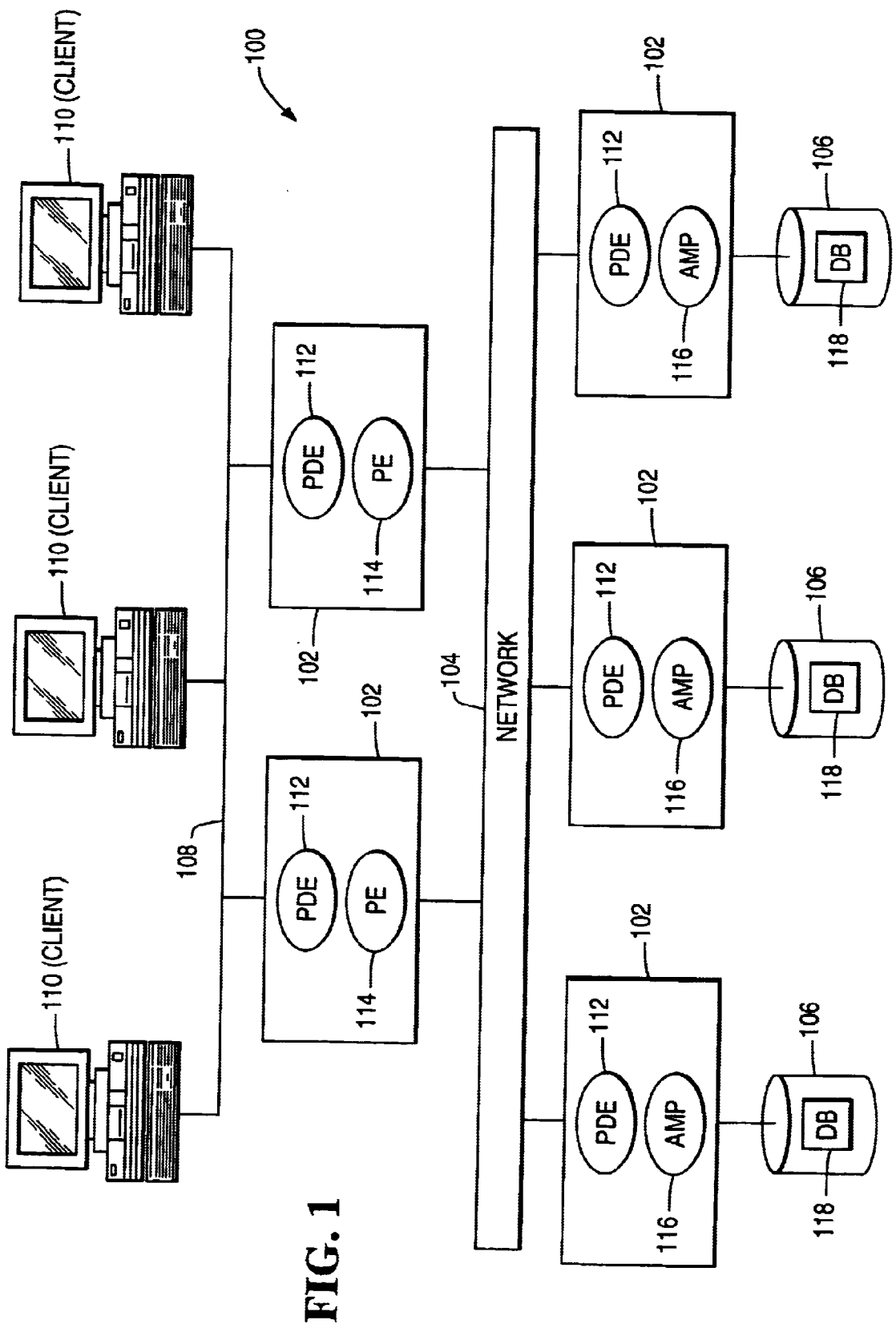
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by a Relational DataBase Management System (RDBMS) executed by the system 100.

In the preferred embodiment of the present invention, the RDBMS comprises the Teradata® product offered by NCR Corporation, the assignee of the present invention, and includes one or more Parallel Database Extensions (PDEs) 112, Parsing Engines (PEs) 114, and Access Module Processors (AMPs) 116. These components of the RDBMS perform the functions necessary to implement the RDBMS and SQL functions, i.e., definition, compilation, interpretation, optimization, database access control, database retrieval, and database update.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

In the preferred embodiment, work is divided among the PUs 102 in the system 100 by spreading the storage of a partitioned relational database 118 managed by the RDBM across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PDEs 112 provides a high speed, low latency, message-passing layer for use in communicating between the PEs 114 and AMPs 116. Further, the PDE 112 is an application programming interface (API) that allows the RDBMS to operate under either the UNIX MP-RAS or WINDOWS NT operating systems, in that the PDE 112 isolates most of the operating system dependent functions from the RDBMS, and performs many operations such as shared memory management, message passing, and process or thread creation.

The PEs 114 handle communications, session control, optimization and query plan generation and control, while the AMPs 116 handle actual database 118 table manipulation. The PEs 114 fully parallelize all functions among the AMPs 116. Both the PEs 114 and AMPs 116 are known as "virtual processors" or "vprocs".

The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to an AMP 116. In the preferred embodiment, data partitioning and repartitioning may be performed, in order to enhance parallel processing across multiple AMPs 116. For example, the database 118 may be hash partitioned, range partitioned, or not partitioned at all (i.e., locally processed).

Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

EXECUTION OF SQL QUERIES

Figure 2:
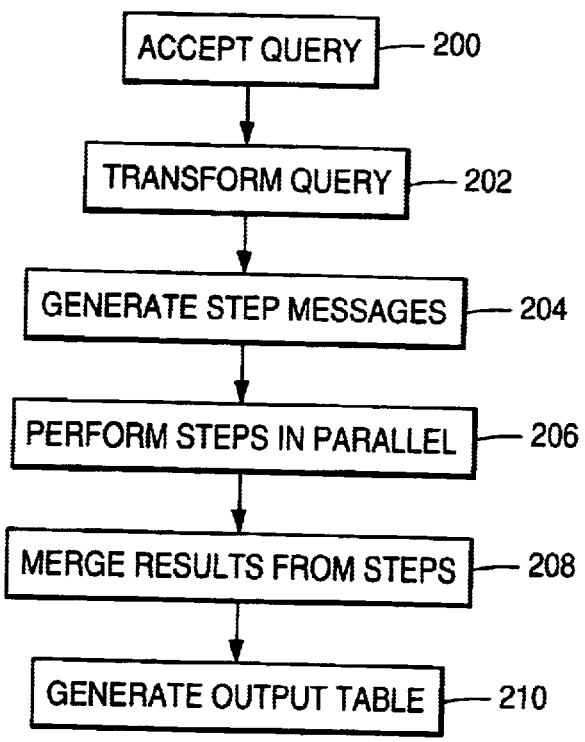
FIG. 2 is a flow chart illustrating the steps necessary for the interpretation and execution of user queries or other SQL statements according to the preferred embodiment of the present invention.

FIG. 2 is a flow chart illustrating the steps necessary for the interpretation and execution of user queries or other SQL statements according to the preferred embodiment of the present invention.

Block 200 represents SQL statements being accepted by the PE 114.

Block 202 represents the SQL statements being transformed by a Compiler or Interpreter subsystem of the PE 114 into an execution plan. Moreover, an Optimizer subsystem of the PE 114 may transform or optimize the execution plan in a manner described in more detail later in this specification.

Block 204 represents the PE 114 generating one or more "step messages" from the execution plan, wherein each step message is assigned to an AMP 116 that manages the desired records. As mentioned above, the rows of the tables in the database 118 may be partitioned or otherwise distributed among multiple AMPs 116, so that multiple AMPs 116 can work at the same time on the data of a given table. If a request is for data in a single row, the PE 114 transmits the steps to the AMP 116 in which the data resides. If the request is for multiple rows, then the steps are forwarded to all participating AMPs 116. Since the tables in the database 118 may be partitioned or distributed across the DSUs 106 of the AMPs 116, the workload of performing the SQL query can be balanced among AMPs 116 and DSUs 106.

Block 204 also represents the PE 114 sending the step messages to their assigned AMPs 116.

Block 206 represents the AMPs 116 performing the required data manipulation associated with the step messages received from the PE 114, and then transmitting appropriate responses back to the PE 114.

Block 208 represents the PE 114 then merging the responses that come from the AMPs 116.

Block 210 represents the output or result table being generated.

STAR JOIN OPERATION

Figure 3:
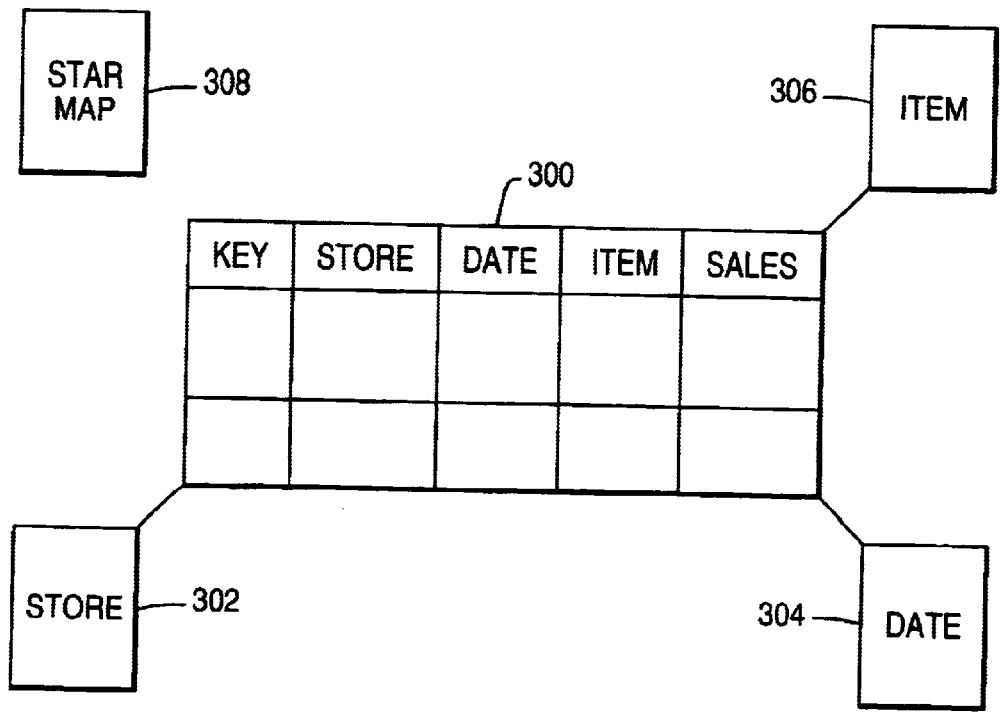
FIG. 3 is a query graph that represents a star join operation according to the preferred embodiment of the present invention.

FIG. 3 is a query graph that represents a star join operation, wherein the boxes 300, 302, 304, and 306 represent tables, and the connections between the boxes 300, 302, 304, and 306 represent the star joins. The fact table 300 at the center of the query graph is joined to two or more dimension tables 302, 304, or 306 according to specified relational or conditional operations.

An exemplary SQL query for performing the star join operation shown in FIG. 3 would be the following:

SELECT <it of columns>
  FROM 300, 302,304,306
  WHERE
    300.STORE=302.STORE AND
    300.DATE=304.DATE AND
    300.ITEM=306.ITEM AND
    <other selection criteria but no more joins>

In this example, the dimension tables 302, 304, and 306 are joined to the fact table 300 with an equivalence condition. Moreover, there are no join conditions between the dimension tables 302, 304, and 306 themselves in this example.

A typical execution plan for the exemplary SQL query would be to perform a sequence of binary joins between the tables 300, 302, 304, and 306. It is the job of the Optimizer subsystem of the PE 114, at step 202 of FIG. 2, to select a least costly binary join order. Generally, the Optimizer subsystem would take into account that the fact table 300 has a relatively large number of rows, while the dimension tables 302, 304, and 306 have relatively few rows.

Nonetheless, there may be numerous unnecessary accesses to the fact table 300 when performing the join operations. Consider one example, using FIG. 3, where the cross-product of the Item, Store, and Date dimension tables 302, 304, and 306 is used to access a Sales fact table 300 to identify a sale in a store for an item for a specific date. Assume that the Item-Store-Date cross-product generates approximately 1 million rows, the Sales fact table 300 has approximately 1 billion rows, and the join operation between the cross-product and the Sales fact table 300 produces only 100,000 result rows, since every item may not be sold at every store on every day. In this example, 90% of the accesses to the Sales fact table 300 are unnecessary.

A Star Map 308 can be applied to these joins (or any join on a hash-ordered left table and unordered right table), to minimize unnecessary accesses to the fact table 300. In the preferred embodiment, the execution plan generated by the Optimizer subsystem of the PE 114 at step 202 of FIG. 2 first performs a join on the dimension tables 302, 304, and 306 to generate a cross-product, then probes a Star Map 308 using the join columns of the cross-product to determine if a corresponding record might exist in the fact table 300, and finally performs a join of the cross-product with the fact table 300, if the probe of the Star Map 308 is successful. The Star Map 308 is a bitmap index structure that is used to filter accesses to the fact table 300, i.e., to determine whether a join operation between the cross-product and the fact table 300 would be productive.

STAR MAP STRUCTURE

Figure 4:
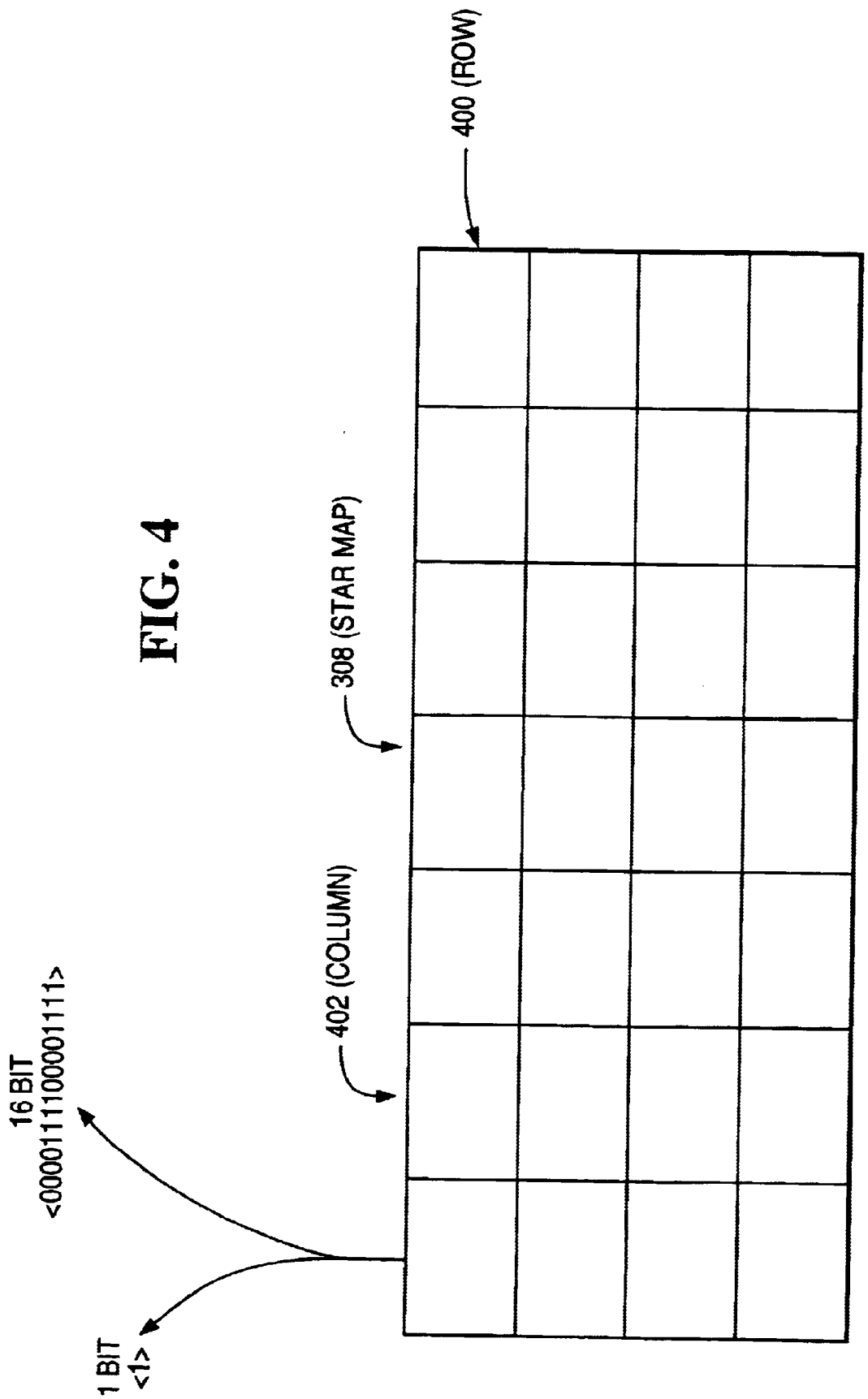
FIG. 4 is a block diagram that further illustrates the structure of a Star Map according to the preferred embodiment of the present invention.

FIG. 4 is a block diagram that further illustrates the structure of a Star Map 308, which includes a plurality of rows 400, wherein each row includes a plurality of columns 402. In the preferred embodiment, the Star Map 308 includes 64K rows 400, each of the rows 400 includes 64K columns 402, and each of the columns 402 comprises either a 1-bit or a 16-bit value. When the number of rows 400 of the Star Map 308 is 64K and each row 400 has 64K columns 402, then the Star Map 308 can map approximately $2^{32}$ or 4 billion rows in the fact table 300 when the column 402 comprises a 1-bit value or $2^{36}$ or 64 billion rows in the fact table 300 when the column 402 comprises a 16-bit value.

The number of rows 400, the number of columns 402, the size of each column 402 value, and the hashing functions used are determined and fixed at creation time, depending on the cardinality of the fact table 300. Of course, those skilled in the art will recognize that any number of rows 400, any number of columns 402, any size of column 402 value, and any number of different hashing functions could be used without departing from the scope of the present invention.

One or more join columns of the fact table 300 are used to generate the column 402 values of the Star Map 308, wherein the join columns usually comprise either a primary or secondary index of the fact table 300. In the example of FIG. 3, the join columns comprise the Store, Date, and Item columns of the fact table 300 that are used for performing the star join operation with the Store dimension table 302, Date dimension table 304, and Item dimension table 306.

In the preferred embodiment, the join columns of each of the rows of the fact table 300 are concatenated and then hashed to generate a 32-bit hash-row value. This 32-bit hash-row value is then used to address the Star Map 308, wherein the upper 16 bits of the 32-bit hash-row value are used to select a row 400 of the Star Map 308 and the lower 16 bits of the 32-bit hash-row value are used to select a column 402 of the selected row 400 of the Star Map 308. The column 402 value indicates whether the corresponding row may exist in the fact table 300. If the selected column 402 value is set, then the corresponding row might exist in the fact table 300; otherwise, the row would not exist in the fact table 300.

When the number of rows in the fact table 300 is less than 4 billion, and when there is not significant skew in the join column values of the fact table 300, then each column 402 of the Star Map 308 may only comprise a 1-bit value to indicate whether the corresponding record exists in the fact table 300. However, when the number of rows in the fact table 300 exceeds 4 billion, or when there is significant skew in the join columns of the fact table 300, then additional bits may be added to each column 402 of the Star Map 308, so that a single column 402 can be used for multiple hash-row values of the fact table 300, in order to deal with hash collisions.

For example, in one embodiment, each column 402 within a row 400 of the Star Map 308 selected by the hash-row value of the fact table 300 may comprise 16 bits. In such an embodiment, each hash-row value of the fact table 300 would select both a row 400 and a column 402 of the Star Map 308, and then another hash function would be performed on the join columns of the fact table 300 to select one of the bits within the selected column 402. If the selected bit is set, then the corresponding row might exist in the fact table 300; otherwise, the row would not exist in the fact table 300. Of course, there would still be the possibility of hash collisions, even with the larger columns 402 of the Star Map 308.

The Star Map 308 is updated whenever changes are made to the fact table 300. For example, when a row is inserted into the fact table 300, a corresponding column 402 value in a corresponding row 400 of the Star Map 308 is set. Similarly, when a row is deleted from the fact table 300, a corresponding column 402 value in a corresponding row 400 of the Star Map 308 is reset, taking hash collisions into account. When a row is updated in the fact table 300, a column 402 value in a row 400 of the Star Map 308 corresponding to the new hash-row value and new column values are set, while a column 402 value in a row 400 of the Star Map 308 corresponding to the old hash-row value and column values are reset, while taking hash collisions into account.

The number of bits stored in each of the 64K columns 402 of the Star Map 308 is called the "degree" of the Star Map 308 and determines the size of each row 400 in the Star Map 308. For example, a Star Map 308 of degree 1 has a row 400 length of 8K bytes, while a Star Map 308 of degree 16 has a row 400 length of 128K bytes. Generally, the degree of the Star Map 308 may be implemented as a parameter, so that the row size can be set to any desired value.

In the embodiments described above, the total size of the Star Map 308 is either 512 MB (a Star Map 308 of degree 1) or 8192 MB (a Star Map 308 of degree 16), respectively. The Star Map 308 may be partitioned across PUs 102 (for example, in a manner similar to the fact table 300) according to the upper 16 bits of the 32-bit hash-row value. Therefore, in a 20-node system 100, each PU 102 would store approximately 25 MB (a Star Map 308 of degree 1) or 410 MB (a Star Map 308 of degree 16) of a partitioned Star Map 308, respectively. Similarly, in a 96-node system, each PU 102 would manage approximately 5 MB (a Star Map 308 of degree 1) or 85 MB (a Star Map 308 of degree 16) of a partitioned Star Map 308, respectively. Partitions of these sizes may fit entirely within the main memory of the PUs 102.

LOGIC OF THE PREFERRED EMBODIMENT

Figure 5:
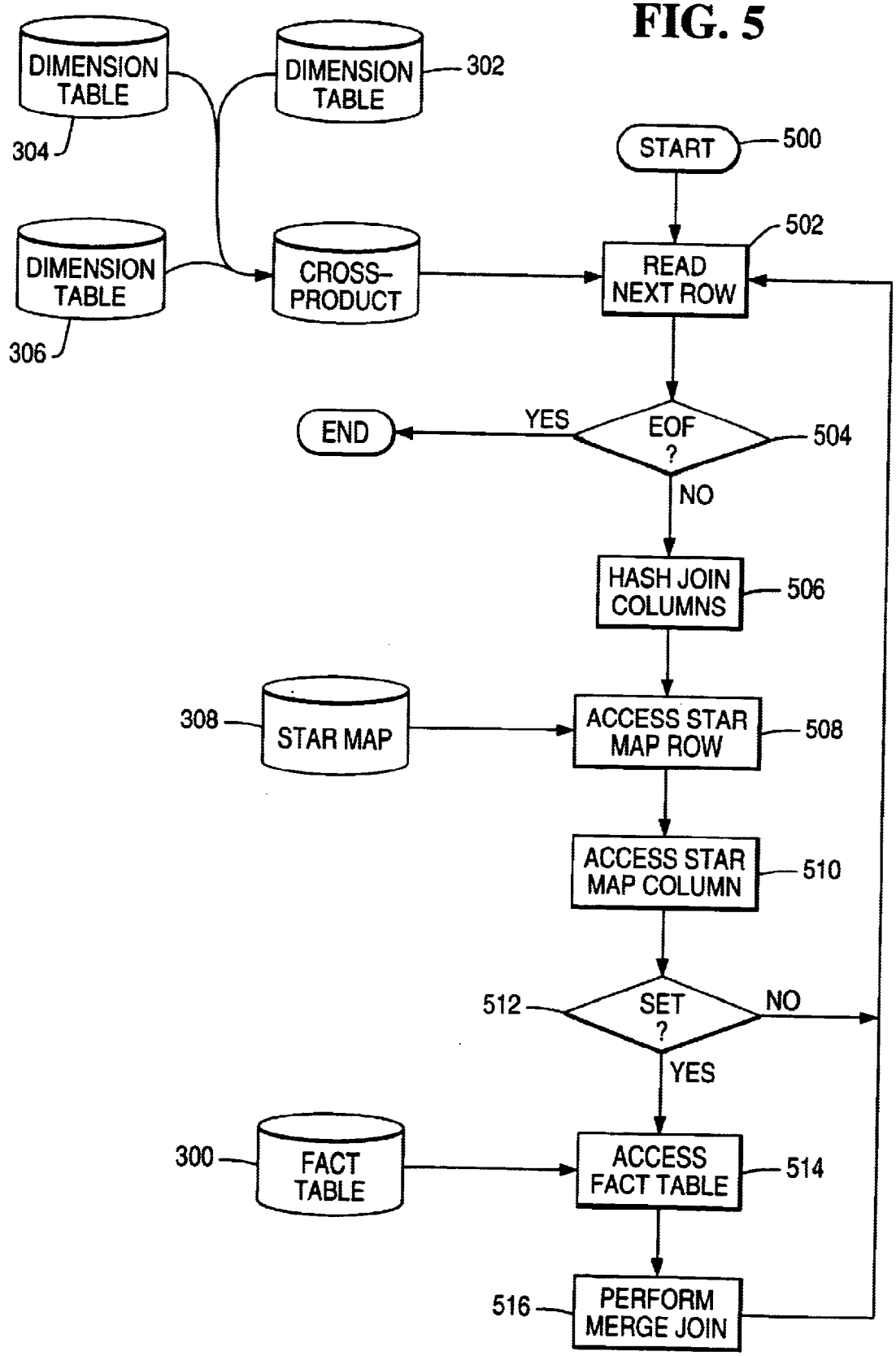
FIG. 5 is a flow chart illustrating the steps necessary for the interpretation and execution of logic according to the preferred embodiment of the present invention.

FIG. 5 is a flow chart illustrating the steps necessary for the interpretation and execution of logic according to the preferred embodiment of the present invention. Although the preferred embodiment uses a specific sequence of steps, those skilled in the art will recognize that the invention disclosed herein may use any number of different steps, so long as similar functions are provided.

Block 500 represents the start of the logic.

Block 502 represents the RDBMS reading the next row of the cross-product resulting from the join of the dimension tables 302, 304, and 306.

Block 504 is a decision block that represents the RDBMS determining whether an end-of-file (EOF) occurred while reading the next row of the cross-product. If an EOF has occurred, then the logic ends; otherwise, control transfers to Block 506.

Block 506 represents the RDBMS hashing the join columns from the cross-product in order to create a 32-bit hash-row value.

Block 508 represents the RDBMS accessing the row 400 of the Star Map 308 indicated by the upper 16 bits of the 32-bit hash-row value.

Block 510 represents the RDBMS accessing the column 402 of the Star Map 308 indicated by the lower 16 bits of the 32-bit hash-row value. In a 1-bit embodiment, the column 402 comprises only a single bit value. In a 16-bit embodiment (or any multiple bit embodiment), however, the join columns from the cross-product are hashed again (typically with a different hashing function) in order to identify a desired one or more of the multiple bits in the column 402.

Block 512 is a decision block that represents the RDBMS determining whether the selected bit(s) from the column 402 of the Star Map 308 indicate that the corresponding row of the fact table 300 may exist. If so, control transfers to Block 514; otherwise, control transfers to Block 502.

Block 514 represents the RDBMS accessing the row of the fact table 300 corresponding to the selected row 400 and column 402 of the Star Map 308. Note that the row of the fact table 300 may not exist, notwithstanding the indication from the Star Map 308. This arises, for example, when hash collisions occur when addressing the row 400 and column 402 of the Star Map 308.

Block 516 represents the RDBMS joining the row of the fact table 300 with the join columns from the cross-product. Thereafter, control transfers to Block 502.

CONCLUSION

This concludes the description of the preferred embodiment of the invention. The following describe some alternative embodiments for accomplishing the same invention. In one alternative embodiment, any type of computer, such as a mainframe, minicomputer, or personal computer, could be used to implement the present invention. In addition, any DBMS that performs star joins could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing a star join in a computer to retrieve data from a relational database stored in one or more data storage devices coupled to the computer, the method comprising:

(a) generating a cross-product from a plurality of dimension tables referenced by the star join;

(b) hashing one or more join columns of the cross-product to create a hash-row value;

(c) using the hash-row value to probe a Star Map to determine whether a record exists in the fact table that corresponds to the cross-product, wherein a fist portion of the hash-row value is used to select a row of the Star Map, a second portion of the hash-row value is used to select a column of the selected row of the Star Map, and a value stored at the selected row and column of the Star Map indicates whether the record ay exist in the fact table that corresponds to the cross-product; and (d) accessing the fact table to perform a join with the cross-product when the selected column of the selected row of the Star Map indicates that the record may exist in the fact table.

2. The method of claim 1, wherein the Star Map comprises a bitmap index structure that is used to filter accesses to the fact table.

3. The method of claim 1, wherein each column of the Star Map stores a value selected from a group comprising a single bit value or a multiple bit vale.

4. The method of claim 3, wherein the single bit value stored in each column of the Star Map indicates whether the record may exist in the fact table.

5. The method of claim 3, wherein the multiple bit value stored in each column of the Star Map indicates whether one or more of a plurality of records exist in the fact table.

6. The method of claim 5, further comprising performing another hash function on the join columns of the cross-product to select one or more of a plurality of bits in the multiple bit value stored in the column of the Star Map, in order to deal with collisions from the hashing step.

7. The method of claim 6, wherein each of the plural of bits in the multiple bit value stored in the column of the Star Map indicates whether a record may exist in the fact table.

8. The method of claim 1, wherein the Star Map is updated whenever changes are made to the fact table.

9. The method of claim 8, wherein a corresponding column in a corresponding row of the Star Map is set when a row is inserted into the fact table.

10. The method of claim 8, wherein a corresponding column in a corresponding row of the Star Map is reset when a row is deleted into the fact table, taking into account hash collisions.

11. The method of claim 8, wherein a first corresponding column in a first corresponding row of the Star Map is reset, taking hash collisions into account, and a second corresponding column in a second corresponding row of the Star Map is set, when a row is updated in the fact table.

12. A computer-implemented system for performing a star join to retrieve data from a relational database stored in one or more data storage devices coupled to a computer, comprising:

(a) means for generating a cross-product from a plurality of dimension tables referenced by the star join;

(b) means for hashing one or more join columns of the cross-product to create a hash-row value;

(c) means for using the hash-row value to probe a Star Map to determine whether a record exists in the fact table that corresponds to the cross-product, wherein a first portion of the hash-row value is used to select a row of the Star Map, a second portion of the hash-row value is used to select a column of the selected row of the Star Map, and a value stored at the selected row and column of the Star Map indicates whether the record may exist in the fact table that corresponds to the cross-product; and (d) means for accessing the fact table to perform a join with the cross-product when the selected column of the selected row of the Star Map indicates that the record may exist in the fact table.

13. The system of claim 12, wherein the Star Map comprises a bitmap index structure that is used to filter accesses to the fact table.

14. The system of claim 12, wherein each column of the Star Map stores a value selected from a group comprising a single bit value or a multiple bit value.

15. The system of claim 14, wherein the single bit value stored in each column of the Star Map indicates whether the record may exist in the fact table.

16. The system of claim 14, wherein the multiple bit value stored in each column of the Star Map indicates whether one or more of a plurality of records exist in the fact table.

17. The system of claim 16, further comprising means for performing another hash function on the join columns of the cross-product to select one or more of a plurality of bits in the multiple bit value stored in the column of the Star Map, in order to deal with collisions from the means for hashing.

18. The system of claim 17, wherein each of the plurality of bits in the multiple bit value stored in the column of the Star Map indicates whether a record may exist in the fact table.

19. The system of claim 12, wherein the Star Map is updated whenever changes are made to the fact table.

20. The system of claim 19, wherein a corresponding column in a corresponding row of the Star Map is set when a row is inserted into the fact table.

21. The system of claim 19, wherein a corresponding column in a corresponding row of the Star Map is reset when a row is deleted into tie fact table, taking into account hash collisions.

22. The system of claim 19, wherein a first corresponding column in a first corresponding row of the Star Map is reset, taking hash collisions into account, and a second corresponding column in a second corresponding row of the Star Map is set, when a row is updated in the fact table.

23. An article of manufacture comprising logic embodying a method for performing a star join in a computer to retrieve data from a relational database stored in one or more data storage devices coupled to the computer, the method comprising:

(a) generating a cross-product from a plurality of dimension tables referenced by the star join;

(b) hashing one or more join columns of the cross-product to create a hash-row value;

(c) using the hash-row value to probe a Star Map to determine whether a record exists in the fact table that corresponds to the cross-product, wherein a first portion of the hash-row value is used to select a row of the Star Map, a second portion of the hash-row value is used to select a column of the selected row of the Star Map, and a value stored at the selected row and column of the Star Map indicates whether the record may exist in the fact table that corresponds to the cross-product; and (d) accessing the fact table to perform a join with the cross-product when the selected column of the selected row of the Star Map indicates that the record may exist in the fact table.

24. The method of claim 23, wherein the Star Map comprises a bitmap index structure that is used to filter accesses to the fact table.

25. The method of claim 23, wherein each column of the Star Map stores a value selected from a group comprising a single bit value or a multiple bit value.

26. The method of claim 25, wherein the single bit value stored in each column of the Star Map indicates whether the record may exist in the fact table.

27. The method of claim 25, wherein the multiple bit value stored in each column of the Star Map indicates whether one or more of a plurality of records exist in the fact table.

28. The method of claim 27, further comprising performing another hash function on the join columns of the cross-product to select one or more of a plurality of bits in the multiple bit value stored in the column of the Star Map, in order to deal with collisions from the hashing step.

29. The method of claim 28, wherein each of the plurality of bits in the multiple bit value stored in the column of the Star Map indicates whether a record may exist in the fact table.

30. The method of claim 23, wherein the Star Map is updated whenever changes are made to the fact table.

31. The method of claim 30, wherein a corresponding column in a corresponding row of the Star Map is set when a row is inserted into the fact table.

32. The method of claim 30, wherein a corresponding column in a corresponding row of the Star Map is reset when a row is deleted into the fact table, talking into account hash collisions.

33. The method of claim 30, wherein a first corresponding column in a first corresponding row of the Star Map is reset, taking hash collisions into account, and a second corresponding column in a second corresponding row of the Star Map is set, when a row is updated in the fact table.

34. A data structure stored in a memory for use in performing a star join in a database management system executed by a computer, the data structure comprising a Star Map for filtering accesses to one or more fact tables referenced in a query, wherein each column of each row of the Star Map stores a column value that indicates whether a record may exist in the fact table, the Star Map is probed for the column values using a hash-row value created from one or more join columns of a cross-product generated from one or more dimension tables referenced by the star join to determine whether the record exists in the fact table that corresponds to the cross-product, wherein a first portion of the hash-row value is used to select a row of the Star Map and a second portion of the hash-row value is used to select a column of the selected row of the Star Map.

35. The data structure of claim 34, wherein the fact table is accessed to perform a join with the cross-product when the selected column of the selected row of the Star Map indicates that the record may exist in the fact table.

36. The data structure of claim 34, wherein each column of the Star Map stores a value selected from a group comprising a single bit value or a multiple bit value.

37. The data structure of claim 36, where the single bit value stored in each column of the Star Map indicates whether the record may exist in the fact table.

38. The data structure of claim 36, wherein the multiple bit value stored in each column of the Star Map indicates whether one or more of a plurality of records exist in the fact table.

39. The data structure of claim 38, wherein another hash function is performed on the join columns of the cross-product to select one or more of a plurality of bits in the multiple bit value stored in the column of the Star Map, in order to deal with hash collisions.

40. The data structure of claim 39, wherein each of the plurality of bits in the multiple bit value stored in the column of the Star Map indicates whether a record may exist in the fact table.

41. The data structure of claim 34, wherein the Star Map is updated whenever changes are made to the fact table.

42. The data structure of claim 41, wherein a corresponding column in a corresponding row of the Star Map is set when a row is inserted into the fact table.

43. The data structure of claim 41, wherein a corresponding column in a corresponding row of the Star Map is reset when a row is deleted into the fact table, taking into account hash collisions.

44. The data structure of claim 41, wherein a first corresponding column in a first corresponding row of the Star Map is reset, taking hash collisions into account, and a second corresponding column in a second corresponding row of the Star Map is set, when a row is updated in the fact table.

* * * * *

UNITED STATES PATENT AND TRADEMARK OFFICE
CERTIFICATE OF CORRECTION

PATENT NO.     : 6,618,729 B1
DATED          : September 9, 2003
INVENTOR(S)    : Bhashyam, R. and Kostamaa, P.

It is certified that error appears in the above-identified patent and that said Letters Patent is hereby corrected as shown below:

Column 9,
Line 4, after "record" delete "ay" and insert -- may --

Column 10,
Line 26, after "into" first occurence, delete "tie" and insert -- the --

Signed and Sealed this

Twenty-ninth Day of March, 2005

JON W. DUDAS
*Director of the United States Patent and Trademark Office*